March 30, 1965 V. V. TIIKKAINEN 3,175,325
BAIT HOLDING DEVICE
Filed Aug. 7, 1963
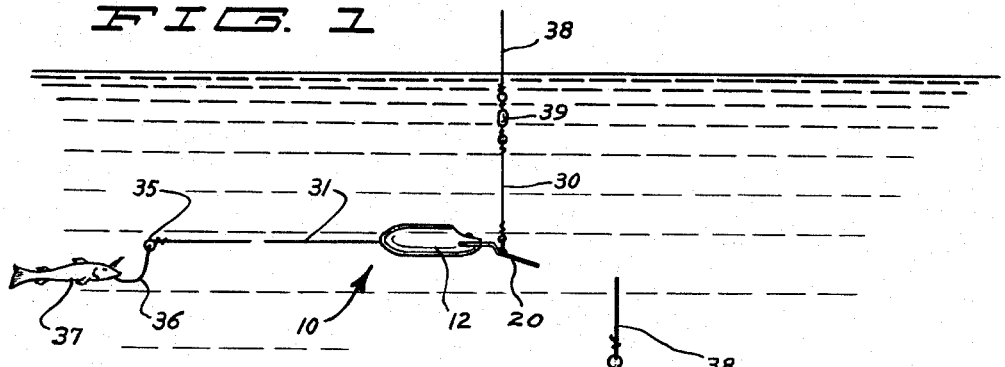
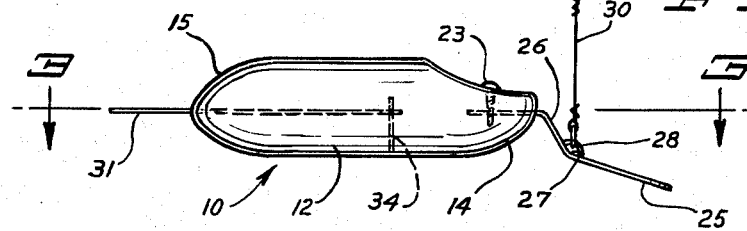
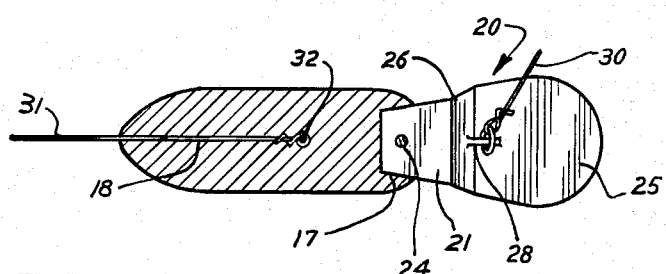
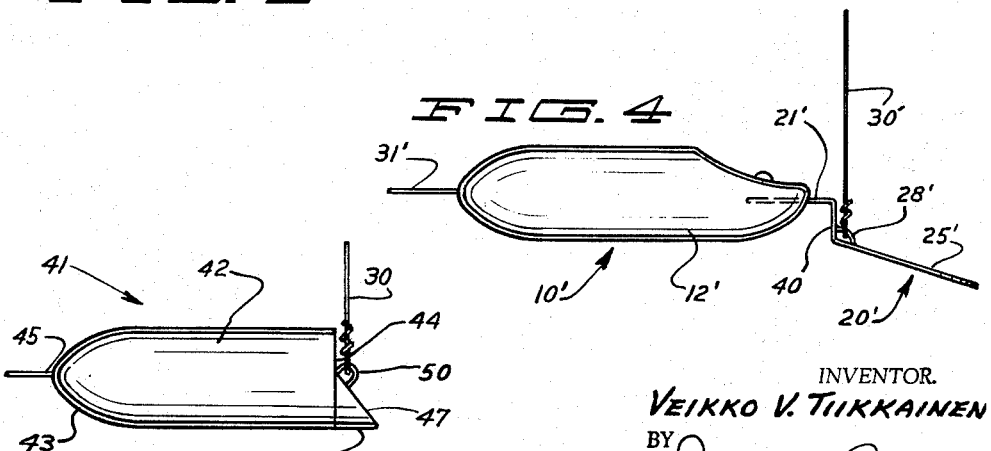
INVENTOR.
VEIKKO V. TIIKKAINEN
BY
Reif and Gregory
ATTORNEYS

United States Patent Office 3,175,325
Patented Mar. 30, 1965

3,175,325
BAIT HOLDING DEVICE
Veikko V. Tiikkainen, 4604 29th Ave. S.,
Minneapolis, Minn.
Filed Aug. 7, 1963, Ser. No. 300,509
2 Claims. (Cl. 43—42.39)

This invention relates to an improvement in fishing apparatus and more specifically to a submersible device for holding fish bait in a particular predetermined position laterally of a fishing line.

In common practice a fish hook with live bait or an artificial bait depends directly downwardly from the end of a fishing line, as in still fishing. A live bait in swimming about will be impeded in its movement by the drag of the fishing line. Further, the fishing line obstructs lateral approach to the bait and often causes what is well known in the art as line bumping.

It is desirable to have means for suspending a bait in water whereby the bait is positioned laterally of the fishing line and some distance therefrom. Further it is desirable to provide freedom for live bait to move about the fishing line without having to drag the fishing line.

It is an object of this invention therefore to provide a fishing apparatus arranged and constructed to be disposed horizontally submerged in connection with a fishing line and to hold bait in a position spaced laterally from the end of the fishing line.

It is another object of this invention to provide for relatively free movement of live bait about a fishing line without it having to drag the fishing line.

It is a further object of this invention to provide for substantially free circular movement of a live bait about the end of a fishing line and to provide for approach to said bait relatively unobstructed by the fishing line.

More specifically it is an object of this invention to provide means at the free end of a fishing line arranged and constructed to be horizontally disposed submersed in a body of water and to have a relatively rigid wire-like member extending outwardly horizontally to support a bait at the free end thereof for relatively free movement circumferentially about said fishing line.

These and other objects and advantages of the invention will be fully set forth in the following description made in connection with the accompanying drawings in which like reference characters refer to similar parts throughout the several views and in which:

FIG. 1 is a view of the device on a reduced scale shown in side elevation in operating position;

FIG. 2 is a broken view of the device in side elevation on an enlarged scale showing some portions thereof in dotted line;

FIG. 3 is a view in horizontal section taken on line 3—3 of FIG. 2 as indicated by the arrows;

FIG. 4 is a view similar to FIG. 2 showing a modification of a portion thereof; and FIG. 5 is a view similar to that in FIG. 4 of a modified form of the device.

Referring to the drawings, the device representing the invention herein is indicated generally by the character 10. The basic inventive concept consists of having a device sinkable in water when taken as a whole but so arranged and constructed that at its point of suspension at the end of a fishing line within a body of water, it will assume and maintain a position such that it will hold in a substantially horizontal position a bait a desired distance from the end of the fishing line whereby the bait may readily move in a circular path about the end of the fishing line without having to drag the fishing line about. A fish may readily approach bait held in this manner and be free from line bumping.

The device may be presented in many specific forms within the scope of my inventive concept. In a preferred embodiment, the device is here shown comprising a main body portion 12 on the order of an artificial bait body being elongated and substantially cylindrical in form, having a tapered nose portion 14 having an upper concaved configuration, and having a tapered tail portion 15.

Said body portion 12 functions as a buoyant or float member and may be formed of cork, wood, plastic or any other material suitable for its purpose and may contain an air chamber as may be desired.

Extending forwardly of said float member 12 is a sinker member 20 which may take various forms and which in the embodiment here shown is in plate form made of suitable metal sheet material. Said sinker member is formed having a tapered rear end portion 21 received within a longitudinal accommodating slot 17 extending inwardly of said nose portion of said float member. A screw 23 is disposed into said nose portion intersecting said slot and extending through the aperture 24 of said sinker portion 21 to secure the same. Said sinker member is in the form of a wiggle lip being tapered transversely outwardly and having a rounded forward end portion 25. Said sinker member has an intermediate portion 26 inclined downwardly at less than a right angle, as indicated in FIGS. 1 and 2, with said forward end portion 25 being angled outwardly therefrom forming an obtuse angle 27 therewith. Struck from said member 20 at the point of said obtuse angle and centrally thereof is an eyelet 28 to which a fishing line may be secured. However, as here illustrated, a leader 30 formed of tackle wire is shown connecting the fishing line 38 and said eyelet.

Extending rearwardly of said float member 12 is a flexible yet substantially rigid wire member 31 having a portion extending inwardly of said float member 12 through an appropriate bore 18, as indicated in FIGS. 2 and 3. Said inwardly extending end of said wire member may be variously secured to said body portion 12 being here shown having an eyelet 32 through which is disposed a pin 34. Said member 31 may be formed very satisfactorily of a suitable gauge of tackle wire.

Said wire member 31 extends outwardly of said float member 12 for a desired distance and will have an outer terminal eyelet 35 to which a hook or artificial bait may be secured. A hook 36 is here shown secured to said eyelet and secured to said hook is a live bait 37. Preferably a hook in somewhat the form of a right angle will be used having a short shank and terminating in the customary barb. The purpose here is to secure the live bait in such a way as to have it substantially horizontally disposed and close to said terminal eyelet.

Said wire member 31 will be sufficiently rigid to maintain a substantially horizontal position while carrying bait at the free end thereof.

Said float member 12 will be so arranged and constructed in view of the wire member 31 as to counterbalance the sinker member 20 to maintain the device 10 as a whole in a horizontal position when submersed. It is understood that the sinker member 20 will be of sufficient weight to sink the device as a whole.

Said leader 30 preferably will be connected to the fishing line 38 by a swivel joint connecting member 39.

Operation

My device may be used in connection with many forms of fishing as with still fishing, trolling, casting or jigging and the like. Its use will here be described as in connection with still fishing.

My device in connection with a fishing line will be submersed to a desired depth at which point it will maintain a substantially horizontal position. Live bait will be able to move in circular paths freely about the fishing line and will have sufficient freedom of movement without being impeded by the drag of the fishing line. The swivel joint 39 as illustrated provides for free radial movement.

The bait will be spaced a sufficient distance from the fishing line whereby the fishing line will be substantially out of the line of approach that a fish might take in advancing on the bait.

My device gives a very nice depth control in fishing rocky or weedy lake bottoms. Once the desired fishing depth has been ascertained, the live bait may move freely about horizontally at such depth and the fishing apparatus will be free of entanglement with the rocks or weeds. Thus a very nice controlled fishing depth is had with ample freedom of movement for the bait. It will be appreciated that live bait will add no weight to the end of the wire member 31. The entire device will be balanced to accommodate any given artificial bait.

Modification

With reference to FIG. 4, a slight modification is shown in my structure. The modified structure is indicated generally by the character 10' and all portions thereof identical with the structure above described are indicated by identical characters with a prime added. The only change in structure is the intermediate portion 40 of the sinker member 20'. Instead of being angled outwardly as is the portion 26, the intermediate portion 40 here shown is bent downwardly at a right angle relative to the portion 21'.

It is seen with reference to FIG. 4, that the leader 30' parallels said intermediate portion 40. In the event that the float member 12' is not accurately balanced relative to the sinker member 20', then any tendency of the float member 12' to rise obliquely will be curbed by the portion 40 nudging against or abutting an adjacent portion of the leader 30'. Thus such a tendency will be well controlled and said float member 12' will be satisfactorily maintained in a horizontal position or very nearly so. It will be understood that a similar result may be secured where a fishing line is secured directly to my device.

Modification

With reference to FIG. 5, a modification 41 of my device is shown in a somewhat different form comprising an elongated cylindrical float member 42 having a tapered rear end portion 43 and a flat front end portion 44 with a wire member 45 identical to the member 31 integral therewith extending rearwardly thereof and having a stub weighted nose portion 46 secured to said front end portion 44, as illustrated in FIG. 5. Said nose portion forms the sinker member corresponding to the member 20 above described and is shown forming an extension of the lower side portion of said float member 42 and having an angled or beveled upper face portion 47 which if seen in plan would be generally U-shaped in form.

An eyelet 50 projects from said end portion 44 at substantially its point of juncture with said face portion 47 and secured thereto is the leader 30 as above described which will be connected to a fishing line also as above described.

This modified form of my device will operate in the same manner as the first modification of my device above described. The flat face portion 44 will bear against the leader 30 to hold said members 42 and 45 in substantially a horizontal position. It will be understood that with a small eyelet used, the leader 30 may be positioned to be very close to said face portion 44.

Thus it is seen that I have provided a very simple construction of a piece of fishing apparatus which in connection with a fishing line holds a bait horizontally disposed relative to a fishing line and provides for free circular movement of a live bait about a fishing line at a desired level. My device has proved very successful in use.

It will of course be understood that various changes may be made in the form, details, arrangement and proportions of the parts, without departing from the scope of my invention which, generally stated, consists in a device capable of carrying out the objects above set forth, in the parts and combinations of parts disclosed and defined in the appended claims.

What is claimed is:

1. The combination of a submersible fishing device in connection with a fishing line comprising
   a buoyant member,
   a sinkable member in connection with said buoyant member and adapted to sink said buoyant member, said sinkable member extending forwardly of said buoyant member,
   an elongated relatively rigid wire-like member fixedly secured to and extending outwardly and rearwardly of said buoyant member for a distance greater than the length of said buoyant member,
   means at the free end of said wire-like member to have bait connected thereto,
   means for connecting said fishing line to a forward point on said device, and
   said buoyant member in submersed condition in connection with said sinkable member normally maintaining said wire-like member in a horizontal position.

2. The combination of a submersible fishing device in connection with a fishing line comprising
   a member comprising a floatable and a sinkable portion integral with one another, said sinkable portion extending forwardly of said floatable portion,
   an elongated relatively rigid wire-like member extending outwardly and rearwardly of said floatable portion for a distance greater than the length of said floatable portion,
   said first mentioned member being arranged and constructed to be submersible as a whole and said floatable portion thereof being arranged and constructed to maintain said wire-like member in substantially a horizontal position,
   means in connection with said wire-like member to have bait connected thereto,
   said sinkable portion having substantially a right angled portion formed therein and extending downwardly relative to a horizontal plane and terminating in a forwardly projecting end portion,
   an upwardly extending eyelet at the junction of said right angled end portion, and
   means connecting said fishing line to said eyelet, said fishing line in operating position being disposed closely adjacent to said angled portion whereby said angled portion in abutting said fishing line forms a stop member to maintain said buoyant member in a substantially horizontal position.

References Cited by the Examiner

UNITED STATES PATENTS

| | | | |
|---|---|---|---|
| 1,352,054 | 9/20 | Dills | 43—42.47 |
| 1,727,936 | 9/39 | Pflueger | 47—42.39 X |
| 2,288,595 | 7/42 | Peterson | 43—42.39 |
| 2,591,294 | 4/52 | Ripich | 43—44.81 X |
| 2,808,677 | 10/57 | Dusablon et al | 43—42.22 |
| 3,044,207 | 7/62 | Dorsett | 43—42.22 |

FOREIGN PATENTS 402,988   9/09   France.

ABRAHAM G. STONE, *Primary Examiner.*